United States Patent [19]

Sato et al.

[11] Patent Number: 4,873,639

[45] Date of Patent: Oct. 10, 1989

[54] TRACTION CONTROL SYSTEM FOR CONTROLLING SLIP OF A DRIVING WHEEL OF A VEHICLE

[75] Inventors: Makoto Sato; Shuji Shiraishi; Tetsuji Muto, all of Wako, Japan

[73] Assignee: Honda Giken Kogyo Kabushiki Kaisha, Tokyo, Japan

[21] Appl. No.: 21,892

[22] Filed: Mar. 4, 1987

[30] Foreign Application Priority Data

Mar. 4, 1986 [JP] Japan .................. 61-46948
Mar. 4, 1986 [JP] Japan .................. 61-46949
Mar. 4, 1986 [JP] Japan .................. 61-46950

[51] Int. Cl.$^4$ .................................. B60T 8/58
[52] U.S. Cl. ........................ 364/426.02; 180/197; 303/95; 303/100; 364/426.01; 364/426.03
[58] Field of Search ............ 364/426, 426.01, 426.02, 364/426.03; 180/197; 361/238; 303/95, 96, 99, 100, 106, 109, 111

[56] References Cited

U.S. PATENT DOCUMENTS

| | | | |
|---|---|---|---|
| 3,169,595 | 2/1965 | Shephard | 180/271 |
| 3,288,232 | 11/1966 | Shepherd | 180/271 |
| 3,400,776 | 9/1968 | Smith | 180/197 |
| 3,508,795 | 4/1970 | Scharlack et al. | 303/104 |
| 3,532,392 | 10/1970 | Scharlack | 303/104 |
| 3,532,393 | 10/1970 | Riordan | 303/104 |
| 3,560,759 | 2/1971 | Buehler et al. | 290/117 |
| 3,586,385 | 6/1971 | Florus et al. | 303/96 |
| 3,617,099 | 11/1971 | Sugiyama | 303/96 |
| 3,622,973 | 11/1971 | Domann et al. | 340/52 R |
| 3,627,074 | 12/1971 | Burckhardt | 180/197 |
| 3,632,176 | 1/1972 | Gaeke | 303/100 |
| 3,659,263 | 4/1972 | Gunsser et al. | 340/52 B |
| 3,659,906 | 5/1972 | Horvath | 303/100 |
| 3,667,813 | 6/1972 | Burckhardt et al. | 303/96 |
| 3,680,655 | 8/1972 | Beyerlein et al. | 180/54.1 |
| 3,701,568 | 10/1972 | Lewis | 303/109 |
| 3,741,043 | 6/1973 | Oya et al. | 74/866 |
| 3,771,839 | 11/1973 | Fink | 303/105 |
| 3,776,322 | 12/1973 | Misch et al. | 172/2 |
| 3,776,357 | 12/1973 | Arai et al. | 180/197 |
| 3,779,331 | 12/1973 | Burckhardt et al. | 180/197 |
| 3,780,346 | 12/1973 | Gagnon | 361/238 |
| 3,802,529 | 4/1974 | Burckhardt et al. | 180/197 |
| 3,811,526 | 5/1974 | Adahan | 180/197 |
| 3,823,373 | 7/1974 | Pike | 324/73 |
| 3,871,235 | 3/1975 | Anderson | 73/510 |
| 3,894,773 | 7/1975 | Cleveland et al. | 303/100 |
| 3,910,647 | 10/1975 | Takeuchi | 303/100 |
| 3,938,612 | 2/1976 | Boudeville et al. | 180/197 |
| 3,941,203 | 3/1976 | Leconte | 180/197 |
| 3,967,862 | 7/1976 | Hunter | 303/103 |
| 4,066,300 | 1/1978 | Devlin | 303/96 |
| 4,154,487 | 5/1979 | Vannini et al. | 303/106 |
| 4,312,249 | 1/1982 | Hau et al. | 74/866 |
| 4,321,676 | 3/1982 | Ohmori et al. | 364/426 |
| 4,347,569 | 8/1982 | Allen, Jr. et al. | 364/426 |
| 4,354,568 | 10/1982 | Griesenbock | 180/197 |
| 4,375,599 | 3/1983 | Bleckmann et al. | 307/519 |
| 4,432,430 | 2/1984 | Lind et al. | 180/197 |
| 4,480,309 | 10/1984 | Burckhardt et al. | 364/426 |
| 4,521,856 | 6/1985 | Phelps et al. | 364/426 |
| 4,545,455 | 10/1985 | Kanemura et al. | 180/197 |
| 4,554,990 | 11/1985 | Kamiya et al. | 180/197 |
| 4,583,611 | 4/1986 | Frank et al. | 180/197 |
| 4,625,824 | 12/1986 | Leiber | 180/197 |
| 4,681,373 | 7/1987 | Nomura et al. | 303/106 |
| 4,735,279 | 4/1988 | Sato | 303/111 X |

FOREIGN PATENT DOCUMENTS 2616228 11/1977 European Pat. Off.

(List continued on next page.)

Primary Examiner—Eugene R. LaRoche
Assistant Examiner—Seung Ham
Attorney, Agent, or Firm—Armstrong, Nikaido, Marmelstein, Kubovcik & Murray

[57] ABSTRACT

A control system for controlling the slip of a driving wheel of a vehicle senses the speed of at least a driving wheel and the vehicle speed. A slip rate calculator and a differentiator calculate the slip rate and the differential of the slip rate, respectively. An excessive slip rate circuit, a prediction control circuit, and an excessive differential slip rate circuit receive inputs from the calculator and differentiator and operate individually or in concert to detect a slip condition. An output circuit is connected to the excessive slip rate, prediction control, and excessive differential slip rate circuits to output a driving wheel slip control signal when at least one of the above circuits detects a slip condition.

33 Claims, 10 Drawing Sheets

FOREIGN PATENT DOCUMENTS

| | | |
|---|---|---|
| 0166258 | 1/1986 | European Pat. Off. . |
| 0186122 | 7/1986 | European Pat. Off. . |
| 2155348 | 4/1973 | France . |
| 2534198 | 4/1984 | France . |
| 44-27169 | 11/1969 | Japan . |
| 47-43691 | 12/1972 | Japan . |
| 48-18695 | 3/1973 | Japan . |
| 49-14566 | 4/1974 | Japan . |
| 49-15876 | 4/1974 | Japan . |
| 49-40814 | 11/1974 | Japan . |
| 50-5764 | 3/1975 | Japan . |
| 50-13530 | 5/1975 | Japan . |
| 50-112927 | 9/1975 | Japan . |
| 51-19239 | 2/1976 | Japan . |
| 51-39828 | 4/1976 | Japan . |
| 51-28888 | 8/1976 | Japan . |
| 51-31915 | 9/1976 | Japan . |
| 51-32198 | 9/1976 | Japan . |
| 51-35974 | 10/1976 | Japan . |
| 51-111577 | 10/1976 | Japan . |
| 51-48236 | 12/1976 | Japan . |
| 51-48334 | 12/1976 | Japan . |
| 52-198 | 1/1977 | Japan . |
| 52-35837 | 9/1977 | Japan . |
| 52-140790 | 11/1977 | Japan . |
| 53-4194 | 2/1978 | Japan . |
| 53-24687 | 7/1978 | Japan . |
| 53-77991 | 7/1978 | Japan . |
| 53-30877 | 8/1978 | Japan . |
| 53-104092 | 9/1978 | Japan . |
| 54-2449 | 2/1979 | Japan . |
| 54-42077 | 12/1979 | Japan . |
| 55-31017 | 8/1980 | Japan . |
| 55-46494 | 11/1980 | Japan . |
| 56-15340 | 4/1981 | Japan . |
| 56-37095 | 8/1981 | Japan . |
| 56-108310 | 8/1981 | Japan . |
| 56-38422 | 9/1981 | Japan . |
| 57-15051 | 1/1982 | Japan . |
| 58-8434 | 1/1983 | Japan . |
| 58-16947 | 1/1983 | Japan . |
| 58-36731 | 3/1983 | Japan . |
| 58-53520 | 3/1983 | Japan . |
| 58-20051 | 4/1983 | Japan . |
| 58-78832 | 5/1983 | Japan . |
| 58-122246 | 7/1983 | Japan . |
| 58-167845 | 10/1983 | Japan . |
| 58-202142 | 11/1983 | Japan . |
| 5947142 | 11/1984 | Japan . |
| 5968537 | 4/1984 | Japan . |
| 5968538 | 4/1984 | Japan . |
| 5977042 | 5/1984 | Japan . |
| 5979050 | 5/1984 | Japan . |
| 5982544 | 5/1984 | Japan . |
| 5985440 | 5/1984 | Japan . |
| 59-115447 | 7/1984 | Japan . |
| 59-120746 | 7/1984 | Japan . |
| 59-145652 | 8/1984 | Japan . |
| 59-202963 | 11/1984 | Japan . |
| 6043133 | 3/1985 | Japan . |
| 6052769 | 3/1985 | Japan . |
| 6056662 | 4/1985 | Japan . |
| 60-104730 | 6/1985 | Japan . |
| 60-107429 | 6/1985 | Japan . |
| 60-107430 | 6/1985 | Japan . |
| 60-110555 | 6/1985 | Japan . |
| 60-121129 | 6/1985 | Japan . |
| 60-128057 | 7/1985 | Japan . |
| 60-135333 | 7/1985 | Japan . |
| 60-143135 | 7/1985 | Japan . |
| 60-143171 | 7/1985 | Japan . |
| 60-147546 | 8/1985 | Japan . |
| 60-151131 | 8/1985 | Japan . |
| 60-154948 | 8/1985 | Japan . |
| 60-163755 | 8/1985 | Japan . |
| 60-166532 | 8/1985 | Japan . |
| 60-169642 | 9/1985 | Japan . |
| 60-191827 | 9/1985 | Japan . |
| 60-197434 | 10/1985 | Japan . |
| 60-199739 | 10/1985 | Japan . |
| 60-209640 | 10/1985 | Japan . |
| 60-234158 | 11/1985 | Japan . |
| 60-240531 | 11/1985 | Japan . |
| 60-240553 | 11/1985 | Japan . |
| 60-249762 | 12/1985 | Japan . |
| 6124653 | 2/1986 | Japan . |
| 6124654 | 2/1986 | Japan . |
| 6146725 | 3/1986 | Japan . |
| 6171229 | 4/1986 | Japan . |
| 6172849 | 4/1986 | Japan . |
| 6172850 | 4/1986 | Japan . |
| 6172851 | 4/1986 | Japan . |
| 6175023 | 4/1986 | Japan . |
| 6175024 | 4/1986 | Japan . |
| 6185248 | 4/1986 | Japan . |
| 6185429 | 4/1986 | Japan . |
| 6189157 | 5/1986 | Japan . |
| 61-125955 | 6/1986 | Japan . |
| 61-132421 | 6/1986 | Japan . |
| 61-139519 | 6/1986 | Japan . |
| 2,162,262 | 1/1986 | United Kingdom ................ 303/104 |

TRACTION CONTROL SYSTEM FOR CONTROLLING SLIP OF A DRIVING WHEEL OF A VEHICLE

BACKGROUND OF THE INVENTION

The present invention relates to a slip rate control device for a vehicle, and more particularly, to a slip rate control device for controlling a driving wheel during the starting or acceleration of the vehicle.

In general, when the traction force of a driving wheel exceeds the friction force between the wheel and a road surface [(the coefficient of friction between a wheel and a road surface)×(load on a driving wheel by the vehicular weight (vehicular load))] during starting or acceleration of the vehicle, the driving wheel slips. When it is assumed that the circumferential speed of the driving wheel is Vw and the vehicular speed is V, the slip rate which indicates the degree of slippage, can be obtained from the following equation:

$$\lambda = (Vw - V)/Vw \qquad (I)$$

Depending on this slip rate $\lambda$, the friction force between the wheel and the road surface (that is, the critical value of the traction force of the driving wheel) varies as shown in FIG. 4. The friction force represented on the vertical axis reaches its maximum value at a predetermined value $\lambda_O$. Here, the friction force between the wheel and the road surface, indicated by the solid curve, is in the travelling direction (longitudinal direction) of the vehicle, but the friction force in the transverse direction (lateral force) falls as the slip rate $\lambda$ gets larger, as indicated by the dotted curve in the drawing.

Based on the above consideration, in order to maximize the driving efficiency of the vehicle by maximizing the friction force in the longitudinal direction between the wheel and the road surface and also to prevent the sideslip of the vehicle by suppressing to the utmost the reduction of the friction force in the transverse direction between the wheel and the road surface, a method is known in which the slip rate $\lambda$ is detected and controlled so that it will be close to the predetermined value $\lambda_O$. More specifically, for example, a lower limit value $\lambda_1$ and an upper limit value $\lambda_2$ of a predetermined range including said predetermined value $\lambda_0$ are set for the slip rate $\lambda$ in accordance with the vehicular speed V. Then, the circumferential speed $V_W$ of the driving wheel is controlled by controlling a torque control unit according to the value of the slip rate $\lambda$ obtained from the driving wheel speed Vw and the vehicular speed V, thereby performing feedback control of the slip rate $\lambda$ of the driving wheel so that it falls within the above predetermined range $\lambda_1 - \lambda_2$.

However, when the gear ratio of the transmission is changed, even if the vehicular speed is not changed, the driving force of the driving wheel is changed, thus the variation width and the variation rate (variation quantity) of the slip rate $\lambda$, which are control parameters, are also varied. For example, the variation width and the variation rate of the slip rate $\lambda$ become larger when the gear of the transmission is set low than those when the gear is set high, thus causing a problem in that the control accuracy of the slip rate $\lambda$ is diminished.

SUMMARY OF THE INVENTION

In order to eliminate above described disadvantage, an object of the present invention is to provide a slip rate control device for a vehicle, wherein, even if the variation width and the variation rate of the slip rate $\lambda$ of the driving wheel, which values are generated during starting or acceleration of a high horse power vehicle or at the time of starting or acceleration of a vehicle on a slippery road surface, are varied by the change of the gear ratio of the transmission, highly accurate control is still performed. Therefore, maximum friction force is generated between the road surface and the wheel so that the reduction in the lateral force generated by the wheel is minimized, as well as improving the driving efficiency of the vehicle.

In order to overcome the above and other disadvantages, the instant invention is directed to a control system for controlling the slip of a driving wheel of a vehicle. The control system comprises a driving wheel speed sensor means for sensing the speed of a driving wheel and for generating a driving wheel speed signal as a function thereof, and a vehicle speed sensor means for sensing the speed of the vehicle and for generating a vehicle speed signal as a function thereof. A slip rate calculation means is coupled to the driving wheel sensor means and the vehicle speed sensor means, for calculating a slip rate of the driving wheel with respect to the vehicle movement. Also, a differentiating means is coupled to the slip rate calculating means, for calculating the differential value of the slip rate, and a setting circuit means is provided for generating a first predetermined differential slip rate value, and a second predetermined differential slip rate value wherein the second predetermined differential slip rate value is greater than said first predetermined differential slip rate value. A first comparison means is operatively coupled to the differentiating means and the setting circuit means, for comparing the differential value of the slip rate with the second predetermined differential slip rate value and outputting a first excess slip signal when the differential value of the slip rate is greater than the second predetermined differential slip rate value. Further, a second comparison means is operatively coupled to the differentiating means and the setting circuit means, for comparing the differential value of the slip rate with the first predetermined slip rate differential value and outputting a first slip signal when the differential value of the slip rate is greater than the first predetermined slip rate differential value. A first generating means is operatively coupled to the vehicle speed sensor means for generating a first reference value as a function of the vehicle speed, and a third comparison means is coupled to the first generating means and the driving wheel speed sensor means, for comparing the first reference value with the driving wheel speed signal and outputting a second slip signal when the driving wheel speed signal is greater than the first reference value. Additionally, a second generating means is operatively coupled to the vehicle speed sensor means for generating a second reference value as a function of vehicle speed, and a fourth comparison means is operatively coupled to the driving wheel speed sensor means and the second generating means for comparing the driving wheel speed signal with said second reference value and outputting a third slip signal when the driving wheel speed signal is greater than the second reference value. Furthermore, an output means is coupled to the first, second, third and fourth comparison means, for providing a driving wheel slip control signal when at least one of
   (i) the first comparison means outputs the first excess slip signal;
   (ii) both the second and third comparison means output the first and second slip signals; and
   (iii) the fourth comparison means outputs the third slip signal.

BRIEF DESCRIPTION OF THE DRAWINGS

The advantages of the invention will become apparent in the following description taken in conjunction with the drawings, wherein.

DETAILED DESCRIPTION OF THE PREFERRED EMBODIMENT

Figure 1:
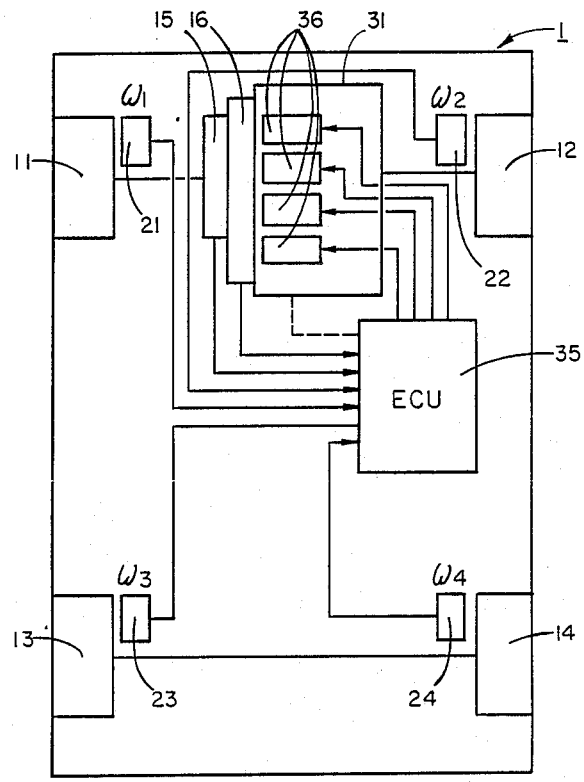
FIG. 1 is a schematic diagram of a vehicle with a control system according to the instant invention.

Referring to FIG. 1, a vehicle 1 is provided with a slip rate control device according to the instant invention. The vehicle 1 is, for example, a front wheel drive type vehicle with front wheels 11 and 12 as driving wheels which are driven by an engine 31, and rear wheels 13 and 14 are trailing wheels. The instant invention is also applicable to a vehicle having rear wheel drive in a similar manner as described below. Further, the instant invention could similarly be applied to a four wheel drive vehicle. Therefore, for the purposes of this application, trailing wheels are considered to be non-driving wheels. In other words, in a front wheel drive car, the trailing wheels would be the rear wheels, while in a rear wheel drive car, the trailing wheels (non-driving wheels) would be the front wheels. Driving wheels 11 and 12 and trailing wheels 13 and 14 are provided with driving wheel speed sensors 21 and 22 and trailing wheel speed sensors 23 and 24, respectively.

The left and right driving wheel speeds $\omega_1$ and $\omega_2$ are detected by driving wheel speed sensors 21 and 22, and left and right trailing wheel speeds $\omega_3$ and $\omega_4$ are detected by trailing wheel speed sensors 23 and 24. The detection signals are input to ECU (Electronic Control Unit) 35. In ECU 35, the larger of the driving wheel speeds $\omega_1$ and $\omega_2$ is selected as the driving wheel speed Vw in equation I above and the average value $(\omega_3+\omega_4)/2$ of the trailing wheel speeds $\omega_3$ and $\omega_4$ is calculated and used as the vehicular speed V in equation I above. The slip rate ($\lambda$) is thus calculated in the following equation:

$$\lambda = \frac{(\omega_1 \text{ or } \omega_2) - \frac{\omega_3 + \omega_4}{2}}{\omega_1 \text{ or } \omega_2} \quad \text{(II)}$$

In this case, "$\omega_1$ or $\omega_2$" means to select only the larger of the two wheel speeds. Furthermore, the differential value (or rate) $\lambda\cdot$ of the slip rate $\lambda$ is also determined by ECU 35.

In addition, a clutch 15 and a transmission 16 are interposed between engine 31 and the driving wheels 11 and 12. Clutch 15 and transmission 16 are equipped with sensors (not shown) which transmit clutch signals and transmission signals, respectively, to ECU 35. In ECU 35, when the clutch signal indicates that clutch 15 is engaged, the torque of driving wheels 11 and 12 is controlled by controlling a fuel supply control unit (described below) thereby controlling the slip rate $\lambda$ of driving wheels 11 and 12. (See equation II above.) The slip rate $\lambda$ is thus reduced by controlling the torque to the driving wheels. The example of FIGS. 1 and 2 control torque by cutting off fuel supply to the engine or more specifically to individual cylinders. Such a process reduces torque to the driving wheels, thus reducing $\lambda_1$ and $\lambda_2$ of the driving wheels, which in turn reduces the slip rate $\lambda$, and enables the driving wheels to regain traction with respect to the road.

Figure 2:
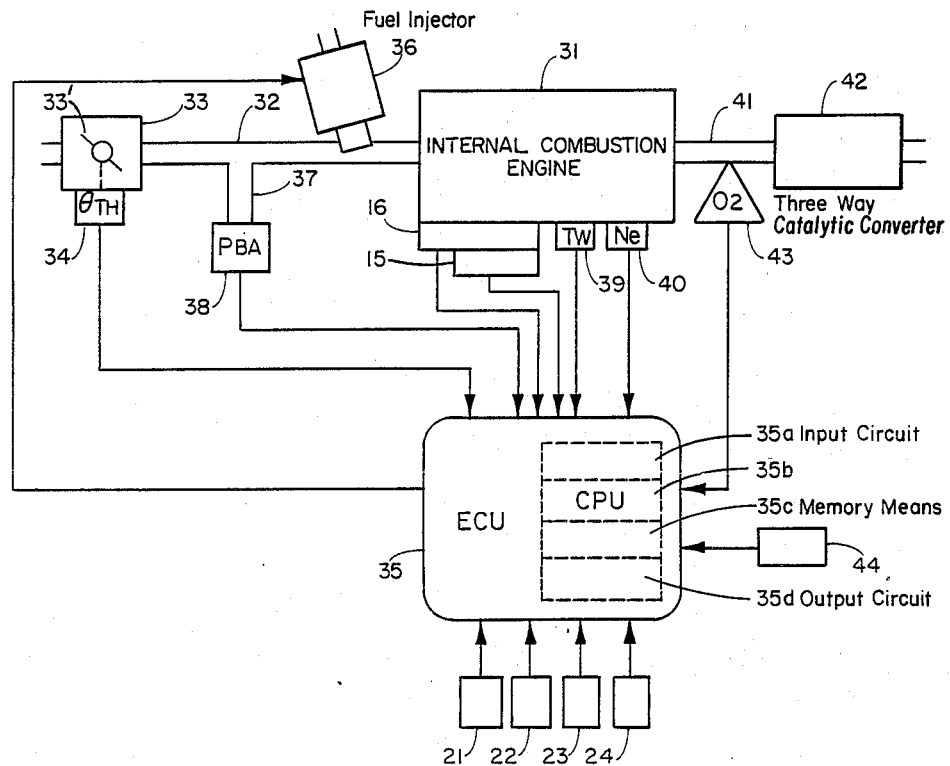
FIG. 2 is a schematic diagram of a fuel supply control unit for supplying fuel to the engine of the vehicle.

It should be noted that other methods of reducing torque to the driving wheels may also be employed in the instant invention. For example, the torque applied to the driving wheels may be reduced by cutting ignition to the engine or by applying brakes to the driving wheels, individually or as a pair. In FIG. 2 the fuel supply control unit is shown operating on a four cylinder internal combustion engine 31, as an example. Of course, the system would be operable on any type of engine. An intake manifold 32 is connected to engine 31 to provide an intake passage thereto. A throttle valve 33' is disposed inside of throttle body 33 which is positioned in intake manifold 32. Adjacent to throttle valve 33' is a throttle valve opening ($\theta$th) sensor 34 which converts the opening of throttle valve 33' into an electrical signal and transmits the signal to ECU 35.

A fuel injection valve (or fuel injector) 36 is positioned between engine 31 and throttle body 33 in the intake manifold 32. A fuel injection valve 36 is positioned slightly upstream of the intake valve (or valves) of each cylinder. The fuel injection valve 36 is connected to a fuel pump and fuel source (not shown) in a conventional manner. Fuel injection valve 36 is electrically connected to ECU 35 as well, and the valve opening time of fuel injection valve 36 is controlled by a signal from ECU 35. Thus, to cut the fuel supply to a cylinder, for example, the corresponding fuel injector would receive a signal (or lack of signal) from ECU 35 causing that injector not to supply fuel to the cylinder.

An absolute pressure ($P_{BA}$) sensor 38 is disposed at the end of pipe 37 which communicates with the intake manifold 32 at a point downstream of throttle valve 33' and upstream of fuel injector 36. An absolute pressure signal, converted into an electrical signal by absolute pressure sensor 38, is transmitted to ECU 35.

An engine cooling water temperature sensor (hereinafter referred to as "Tw sensor") 39 is disposed on engine 31 to monitor the temperature of the engine cooling water. The Tw sensor 39 consists of a thermistor (or like device) mounted in the circumferential wall of the engine cylinder which is filled with cooling water and applies the detected water temperature signal to ECU 35. An engine speed sensor (hereinafter referred to as "Ne sensor") 40 is connected to a crankshaft or camshaft (not shown) of the engine. The Ne sensor 40 outputs a crank angle position signal (hereinafter referred to as "TDC (top dead center) signal") at a predetermined crank angle position for every 180° rotation of the crankshaft of the engine, i.e. in this example with a four cylinder engine, Ne sensor 40 outputs a TDC signal at a crank angle position before a predetermined angle relating to top dead center (TDC) at the beginning of the intake stroke for each cylinder, and this TDC signal is transmitted to ECU 35.

A three way catalytic converter 42 is disposed in exhaust pipe 41 and performs the purging of HC, CO and $NO_x$ components in the exhaust gas. On the upstream side of catalytic converter 42, an $O_2$ sensor 43 is disposed in exhaust pipe 41. Sensor 43 detects the concentration of oxygen in the exhaust gas and transmits an $O_2$ concentration signal to ECU 35.

Furthermore, driving wheel speed sensors 21 and 22, and trailing wheel speed sensors 23 and 24 are connected to ECU 35. An auxiliary parameter sensor 44 is provided to input to ECU 35, and may be used for detecting other engine parameters.

ECU 35 includes an input circuit 35a for shaping the input signal waveforms from various sensors (including from driving wheel speed sensors 21 and 22, trailing wheel speed sensors 23 and 24, the sensor of clutch 15 and the sensor of transmission 16), to correct the voltage level to a predetermined level, to convert an analog signal value to a digital signal value and so forth. ECU 35 also includes a central processing unit (hereinafter referred to as "CPU") 35b, memory means 35c storing various operational programs which are executed in CPU 35b and operational results therefrom, etc., and an output circuit 35d which outputs a driving signal to fuel injection valve 36, and so forth.

For example, whenever the TDC signal is input to ECU 35, the CPU 35b calculates the fuel injection time Tout for fuel injection valve 36 from the following equation based on engine parameter signals from the above various sensors which are fed through the input circuit 35a $$Tout = Ti \times G_1 + G_2 \tag{III}$$

wherein Ti is a basic value of the injection time of the fuel injection valve 36 and is determined in accordance with engine speed Ne and absolute pressure $P_{BA}$ in the intake manifold. $G_1$ and $G_2$ are a correction coefficient and a correction variable which are calculated from predetermined arithmetic expressions such that various characteristics such as starting characteristics, exhaust gas characteristics, and acceleration characteristics may be optimized corresponding to the driving condition of the engine as detected by the above sensors. Then, CPU 35b through output circuit 35d feeds a driving signal to fuel injection valve 36 to open valve 36 for a time Tout as set forth above. For example, in order to cut fuel to a cylinder, the driving signal from CPU 35b would simply be inhibited.

Figure 3:
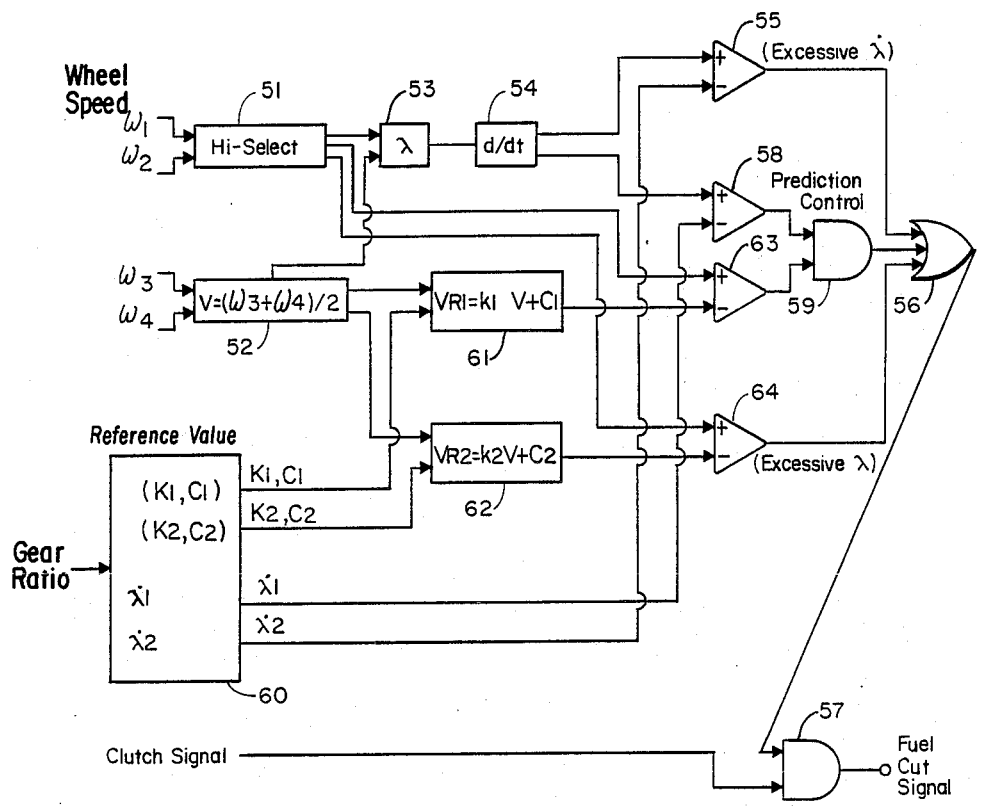
FIG. 3 is a schematic diagram of a logic circuit of the ECU of FIG. 2.

FIG. 3 is a schematic diagram of a circuit showing the configuration of the principal part of CPU 35b of FIG. 2. In FIG. 3, selection circuit 51 (also known as the Hi-Select circuit) receives driving wheel speed signal inputs from driving wheel speed sensors 21 and 22 which represent $\omega_1$ and $\omega_2$, respectively. Selection circuit 51 then selects the larger value (Vw) of the two detected driving wheel speeds $\omega_1$ and $\omega_2$. A vehicular speed arithmetic circuit 52 receives inputs from trailing wheel sensors 23 and 24 (representing $\omega_3$ and $\omega_4$ respectively) and calculates the average value $V = (\omega_3 + \omega_4) \div 2$ as the vehicular speed V based on the trailing wheel speed $\omega_3$ and $\omega_4$. It is also contemplated that the vehicular speed may be detected by other means. For example, the vehicular speed V might be determined based on the phase between an output wave of an ultrasonic device and a sensed reflection wave from the road.

The circuit of FIG. 3 can be divided into three operational portions, the excessive $\lambda \cdot$ portion (where $\lambda \cdot$ is the differential value of the slip rate $\lambda$), the prediction control portion, and the excessive portion (where $\lambda$ is the slip rate as indicated above in equations I or II). Outputs from selection circuit 51 and arithmetic circuit 52 are applied to a slip rate calculating circuit 53. The slip rate calculating circuit 53 calculates the slip rate $\lambda$ based on equation I or II set forth above. The output of slip rate calculating circuit 53 is then input to differentiating circuit 54. The differentiating circuit 54 calculates the differential value $\lambda \cdot$ of the slip rate.

The excessive $\lambda \cdot$ portion of the circuit is illustrated when an output of the differentiating circuit 54 is applied to the excessive $\lambda \cdot$ decision circuit (or first comparison circuit) 55. A predetermined value setting circuit 60 provides predetermined values which are used as reference or comparison values. The predetermined value setting circuit 60 provides a value $\lambda \cdot_2$ (i.e., a predetermined differential slip rate value) to the minus input of the excessive $\lambda \cdot$ decision circuit 55. The output of circuit 55 is then applied to OR gate 56. The output of OR gate 56 is input to AND gate 57. The other input to AND gate 57 is connected to the sensor of clutch 15. The output of AND gate 57 provides a slip control signal to control the slip of the driving wheels by reducing torque, by cutting off the fuel supply, by cutting off the ignition, or by applying braking force, or by any other method used for controlling the slip of the driving wheels.

The prediction control portion of the circuit of FIG. 3 includes first prediction control decision circuit (or second comparison means) 58 and second prediction control decision circuit (or third comparison means) 63. The outputs of the comparison circuits 58 and 63 are applied to an AND gate 59 and the output of AND gate 59 is applied to OR gate 56. Specifically, the positive input of the second comparison circuit 58 receives the output of differentiating circuit 54. The negative input of second comparison circuit 58 is received from setting circuit 60. Setting circuit 60 provides a $\lambda \cdot_1$ value (a predetermined differential slip rate ) to the negative input of the second comparison circuit 58.

The positive input of third comparison circuit 63 is received from the output of selection circuit 51. The minus input of third comparison circuit 63 is received from a first speed arithmetic circuit (or first generating circuit) 61. The first generating circuit 61 calculates a reference value $V_{R1}$ based on constant values $K_1$ (where $K_1 > C_1$) and $C_1$, which constant values are received from setting circuit 60 and the vehicle velocity which velocity is received from vehicular speed arithmetic circuit 52.

The excessive $\lambda$ portion of the circuit includes an excessive $\lambda$ decision circuit (or fourth comparison means) 64. The output of fourth comparison circuit 64 is also applied to OR gate 56. The positive input of fourth comparison circuit 64 is provided from the output of selection circuit 51. The negative input of fourth comparison circuit 64 is received from a second speed arithmetic circuit (or second generating circuit) 62. The second generating circuit 62 calculates a reference value $V_{R2}$ based on predetermined constant values $K_2$ and $C_2$ and the vehicle velocity. The vehicle velocity is received from vehicular speed arithmetic circuit 52, while the constants $K_2$ and $C_2$ are received from setting circuit 60. The predetermined values set in setting circuit 60 depend on the specific vehicle using the instant traction control system. The predetermined values set in the setting circuit 60 are generally determined by empirical studies. Also, an input from the transmission may be supplied to setting circuit 60 so that the predetermined values may also depend upon the gear ratio of the transmission.

The operation of FIGS. 1 and 2 and the circuit of FIG. 3 will be described below.

Figure 4:
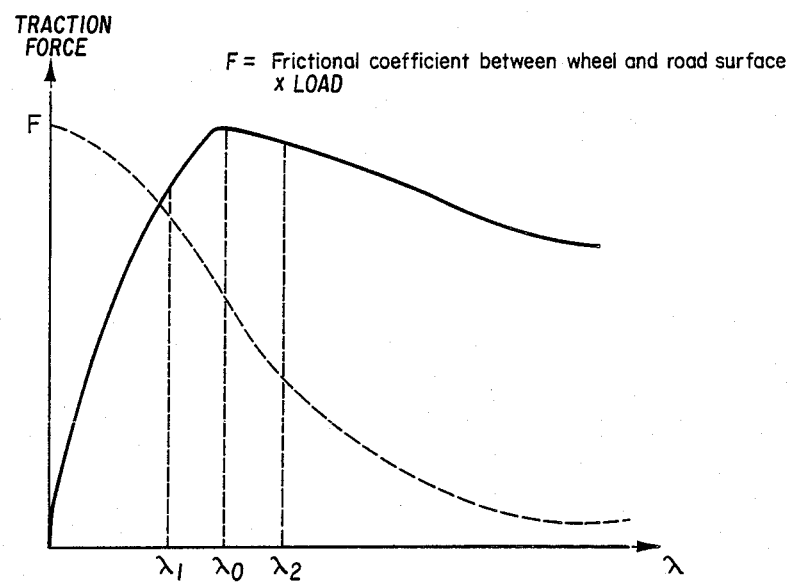
FIG. 4 is a graph showing the traction force between a wheel and road surface versus the slip rate.

Specifically, with reference to FIGS. 1 and 2, ECU 35 sets a lower limit value $\lambda_1$ and upper limit value $\lambda_2$ in a predetermined range, including the predetermined value $\lambda_o$ (shown in FIG. 4) as the reference value for slip rate control determined for the slip rate $\lambda_o$ in accordance with the gear ratio determined by the transmission signal. Further, the ECU sets first and second reference values $\lambda \cdot_1$ and $\lambda \cdot_2$ ($\lambda \cdot_2$ greater than $\lambda \cdot_1$) for slip rate variation control for the differential $\lambda \cdot$ of the slip rate in accordance with the gear ratio, the control delay from the operation command to a fuel supply control unit (until the device starts operation practically), and the above said predetermined value $\lambda_o$ for slip rate control. Thereby the above described fuel supply control unit is controlled in accordance with the difference between either one of the driving wheel speed signals $\omega_1$ or $\omega_2$, and the reference values $V_{R1}$ and $V_{R2}$ corresponding to $\lambda_1$ and $\lambda_2$, respectfully. The difference between the differential $\lambda \cdot$ of the slip rate and the first and second reference values $\lambda \cdot_1$ and $\lambda \cdot_2$ is described in detail below. In other words, ECU 35 controls the fuel supply control unit in accordance with the control rules (i)–(iii) as follows:

(i) If $\lambda > \lambda_1$ and $\lambda \cdot > \lambda \cdot_1'$, control of the system is effected so that $\lambda$ is reduced, for example, the fuel is cut (prediction control).

(ii) If $\lambda > \lambda_2'$, control of the system is effected so that $\lambda$ is reduced, for example, the fuel is cut (prevention of excessive slip rate $\lambda$).

(iii) If $\lambda \cdot > \lambda \cdot_2$, control of the system is effected so that $\lambda$ is reduced, for example, the fuel is cut (prevention of excessive differential slip rate $\lambda \cdot$).

The reason the differential slip rate (variation of slip rate) $\lambda \cdot$ is used in addition to the slip rate $\lambda$ in order to control the slip rate $\lambda$ as shown in abovesaid control rules (i) thru (iii), is that, since it is predicted that the slip rate $\lambda$ comes off the predetermined range $\lambda_1 - \lambda_2$ in case the differential slip rate $\lambda$ is large even if the slip rate $\lambda$ is within the predetermined range $\lambda_1 - \lambda_2$, improvement of the response characteristic of the control of the slip rate $\lambda$ is accomplished by performing prediction control, etc. as set forth above.

Specifically with regard to FIG. 3, driving wheel speed signals $\omega_1$ and $\omega_2$ are obtained from driving wheel speed sensors 21 and 22, respectively. The selection circuit 51 (or Hi-Select circuit) then outputs a signal based on the higher of the values $\omega_1$ and $\omega_2$. Also, as set forth above, the vehicular speed arithmetic circuit 52 calculates the vehicle speed V based on the average value of the two trailing wheel speed signals from the trailing wheel speed sensors 23 and 24. Then, the output signals from selection circuit 51 and arithmetic circuit 52 are received by slip rate calculating circuit 53. The slip rate calculating circuit 53 calculates the slip rate $\lambda$ based on equation II set forth above. The differentiating circuit 54 receives the output of the slip rate calculating circuit 53 and calculates the differential value $\lambda \cdot$ of the slip rate. The predetermined value setting circuit 60 sets lower limit speed value coefficient $K_1$ and constant $C_1$, upper limit speed value coefficient $K_2$ and constant $C_2$, and first and second differential slip rate reference values $\lambda \cdot_1$ and $\lambda \cdot_2$ based on the gear ratio, respectively. Further, the above first and second reference values $\lambda \cdot_1$ and $\lambda \cdot_2$ are set after correction corresponding to above described control delay of the fuel supply control unit and the lower limit and upper limit values $\lambda_1$ and $\lambda_2$.

When the excessive $\lambda \cdot$ decision circuit (or first comparison circuit) 55, determines that the differential value $\lambda \cdot$ of the slip rate is larger than the second reference value $\lambda \cdot_2$ by comparing the output signal from differentiating circuit 54 with the output signal representing the second reference value $\lambda \cdot_2$ (from the setting circuit 60), the comparison circuit 55 outputs a high level signal (hereinafter referred to as "HI signal") to an AND gate 57 through an OR gate 56, and in other cases, outputs a low level signal (hereinafter referred to as "LO signal").

Further, when clutch 15 has been engaged, and the engine and the driving wheels have been coupled with each other, a sensor provided on clutch 15 outputs a HI signal directly to AND gate 57. When the HI signal is input from both the OR gate 56 and the sensor on clutch 15, AND gate 57 outputs a fuel cut signal which inhibits the output of the fuel injection time Tout which would normally inject fuel during the time Tout from fuel injection valve 36, thus valve 36 remains closed thereby reducing the torque of driving wheels 11 and 12. Thus, when the differential value $\lambda \cdot$ of the slip rate is larger than the second reference value $\lambda \cdot_2$, i.e. when the differential slip rate $\lambda \cdot$ is getting larger sharply, the differential slip rate $\lambda \cdot$ is controlled so that it gets smaller (i.e., the prevention of excessive slip rate speed).

First prediction control decision circuit (or second comparison circuit) 58 outputs a HI signal to AND gate 59 when it determines that the differential value $\lambda \cdot$ of the slip rate is larger than the first reference value $\lambda \cdot_1$. Otherwise, second comparison circuit 58 outputs a LO signal. Additionally, a first speed arithmetic circuit (or first generating circuit) 61 calculates a reference value $V_{R1}$ based on a correction coefficient $K_1$ and a correction constant $C_1$ which are stored in setting circuit 60, which may be a ROM (Read Only Memory) associated with ECU 35. Values $K_1$ and $C_1$ may be selected as a function of the gear ratio: First generating circuit 61 then calculates the first predetermined speed reference value $V_{R1}$ from the following equation:

$$V_{R1} = K_1 V + C_1 \qquad (IV)$$

Here, a value which satisfies the equation $\lambda_1 = (V_{R1} - V) \div V_{R1}$ is set for constants $K_1$ and $C_1$. The second prediction control decision circuit (or third comparison circuit) 63 outputs a HI signal to AND gate 59 when it determines that the driving wheel speed Vw is larger than the first predetermined speed reference value $V_{R1}$ by comparing the output signal from selection circuit 51 with the output signal from the first speed arithmetic circuit (or first generating circuit) 61. In other conditions, third comparison circuit 63 outputs a LO signal. When a HI signal is input from both the first and second prediction control decision circuits 58 and 63, AND gate 59 also outputs a HI signal to OR gate 56. Then, as previously described, OR gate 56 outputs a HI signal to AND gate 57, and if the clutch 15 is engaged, AND gate 57 outputs the fuel cut signal, and thus the fuel cut is accomplished. As a result, it is presumed that the slip rate λ is coming off the predetermined range $\lambda_1$–$\lambda_2$ and getting larger gradually when (the slip rate λ)>(the lower limit value $\lambda_1$) and (the differential value λ· of the slip rate)>(the first reference value $\lambda\cdot_1$) However, in such a case, the torque of driving wheels 11 and 12 is reduced and the slip rate is controlled so that it gets smaller, thereby preventing the slip rate λ from becoming excessive (thus prediction control is achieved).

Furthermore, second speed arithmetic circuit (or second generating circuit) 62 calculates a second reference value $V_{R2}$ based upon a correction coefficient $K_2$ and a correction variable $C_2$ which are stored in setting circuit 60. Circuit 62 also receives vehicle speed V, from the vehicular speed arithmetic circuit 52. It then calculates the second predetermined speed value $V_{R2}$ from $K_1$, $C_1$, and vehicular speed V from the following equation, wherein constants K2 and C2 are set in the same manner as K1 and C1:

$$V_{R2} = K_2 V + C_2 \tag{V}$$

The excessive λ decision circuit (or fourth comparison circuit) 64 outputs a HI signal to AND gate 57 through OR gate 56 when it determines that the driving wheel speed $V_W$ from the selection circuit 51 is larger than the second predetermined reference value $V_{R2}$ from the second speed arithmetic circuit 62 by comparing the two values. Then, as previously described, AND gate 57 outputs a fuel cut signal if the clutch 15 is engaged, and thus the fuel cut function is performed. As a result, when the slip rate λ is larger than the second predetermined value $\lambda_2$, i.e., when the slip rate λ is excessive, the slip rate is controlled so that it is reduced (thus, prevention of excessive slip rate is achieved).

In abovementioned method, for prediction control of the slip rate λ, excessive slip rate prevention control and excessive differential slip rate prevention control based on control rules (i)–(iii) described above, the reference range $\lambda_1$ — $\lambda_2$ may be regulated in accordance with the gear ratio of transmission 16, and at the same time, the first and second reference values $\lambda\cdot_1$ and $\lambda\cdot_2$ related to the differential slip rate λ· may also be regulated in accordance with the gear ratio of the transmission 16. Accordingly, even if the variation width and the variation rate of the slip rate λ, which are control parameters, are changed by the change of the driving force of the driving wheel due to the change of the gear ratio of the transmission 16, control of the slip factor λ is performed as set forth above no matter what the transmission gear ratio is.

Since the control of the slip rate is prevented when clutch 15 is completely disengaged (through AND circuit 57) a problem does not arise wherein clutch 15 is not engaged and useless slip rate control is performed notwithstanding the fact that no driving force is being applied to the driving wheels 11 and 12. Nor does a problem arise wherein the fuel cut signal is output by control runaway, etc., resulting in engine 31 stalling, notwithstanding the fact that clutch 15 has been disengaged completely and the engine speed has been reduced.

Further, it is preferable that computed values are read out of a $V - V_{R1}$ table and a $V - V_{R2}$ table which are stored in advance in memory means 35c instead of calculating first and second predetermined values $V_{R1}$ and $V_{R2}$ by multiplication and addition by the first and second speed arithmetic circuits 61 and 62 based on equations IV and V everytime the control is performed. This reduces the processing time, which improves the response characteristic of the slip rate control.

Figure 5:
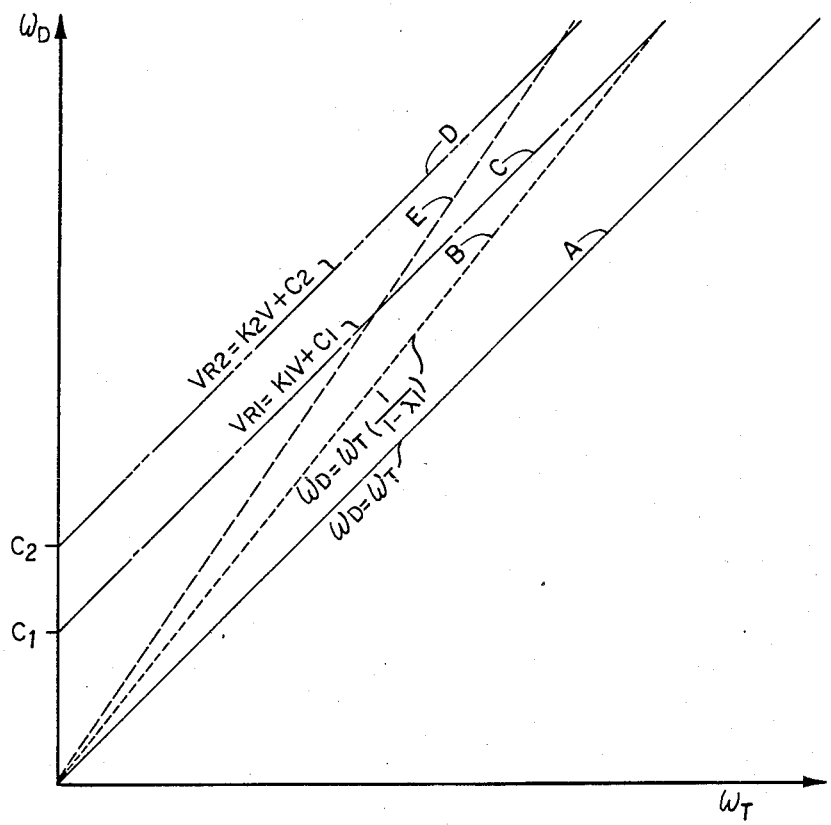
FIG. 5 is a graph showing the trailing wheel speed versus the driving wheel speed.

FIG. 5 is a graph of the driving wheel speed ($\omega_D$) versus the trailing wheel speed ($\omega_T$). Line A indicates the condition where there is no slip. In other words, line A shows the condition where the driving wheel speed is equal to the trailing wheel speed:

$$\omega_D = \omega_T \tag{VI}$$

Line B illustrates a theoretical condition for predicting slip where:

$$\omega_D = \omega_T \left( \frac{1}{1 - \lambda_1} \right) \tag{VII}$$

This is derived from equation II which can be summarized as:

$$\lambda_1 = \frac{\omega_D - \omega_T}{\omega_D} \tag{VIII}$$

$$1 - \lambda_1 = \frac{\omega_T}{\omega_D} \tag{IX}$$

$$\omega_D = \omega_T \left( \frac{1}{1 - \lambda_1} \right) \tag{VII}$$

However, reference values from the first and second generating circuits 61 and 62 are determined in accordance with lines C and D, respectively. Line C represents equation IV:

$$V_{R1} = K_1 V + C_1 \tag{IV}$$

Wherein, $C_1$, as set forth above, is selected in order to overcome practical difficulties in actually detecting slip at low speeds. $K_1$ is selected so that line C intersects theoretical line B at a predetermined speed. Line C, which approximates theoretical line B at higher speeds, is therefore used to produce the reference value $V_{R1}$. Line D is also determined similarly to line C and is used to produce the reference value $V_{R2}$, which would approximate a theoretical value of $\omega_D$ as a function of $\omega_T$ as indicated by line E. Thus, as shown, line D represents equation V:

$$V_{R2} = K_2 V + C_2 \tag{V}$$

Figure 6A:
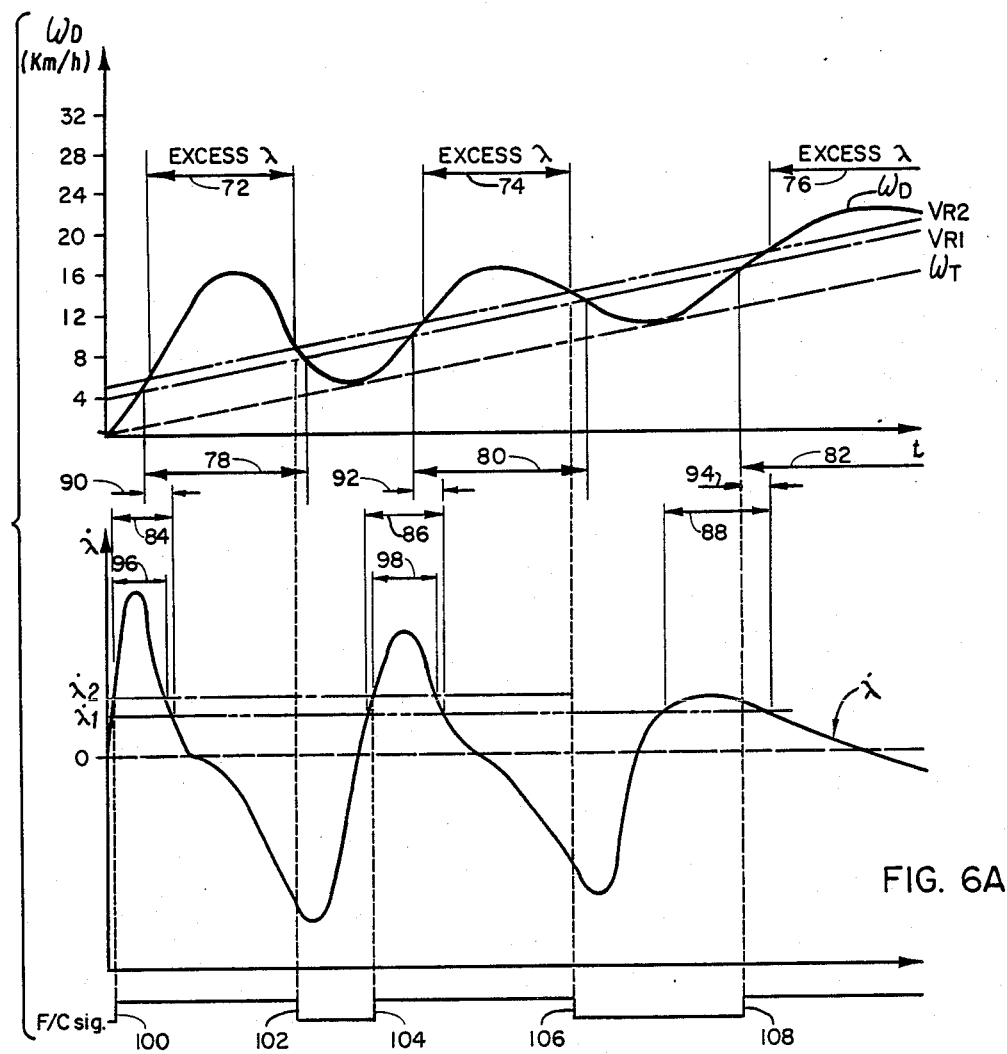
FIG. 6A is a graph showing the values of the driving wheel speed signal superposed above a graph showing the differential slip rate as a function of time.

FIG. 6 is a graph of the driving wheel speed $\omega_D$ as a function of time. Time t is indicated on the horizontal axis and the driving wheel speed $\omega_D$ is indicated on the vertical axis. The solid curve actually relates to the speed of the driving wheel $\omega_D$. The dotted line relates to the speed of the vehicle or trailing wheel speed $\omega_T$. Reference values $V_{R1}$ and $V_{R2}$ are indicated as diagonal lines. Reference value $V_{R1}$ is shown by the single dot line and reference value $V_{R2}$ is shown by the double dot line. These lines represent the same lines in FIG. 5. Below the graph of the driving wheel speed is a graph of the differential slip rate $\lambda \cdot$ with respect to time. These two graphs are combined into 6A since they both operate to generate a driving wheel slip control signal which will control the torque of the engine. Further, below the graph of the differential slip rate in FIG. 6A is a graph of the fuel cut (F/C) signal in an on or off state. The dotted line between fuel cut signal graph and the two graphs above it are for reference to indicate which events in the two upper graphs cause the fuel cut signal to turn on or turn off.

For example, in the top graph of FIG. 6A, the excess $\lambda$ portions are indicated by arrows 72, 74, and 76. This is where the driving wheel speed $\omega_D$ is greater than the second reference value $V_{R2}$. At the points represented by arrows 72, 74, and 76, the excess $\lambda$ circuit becomes operative and comparator 64 is turned on and thus outputs a HI signal.

Below the top graph of FIG. 6A, the solid arrows 78, 80, and 82 represent the position where the driving wheel speed $\omega_D$ is greater than first reference value $V_{R1}$. This is used in the prediction control circuit. In other words, when considered in conjunction with FIG. 3, arrows 78, 80, and 82 represent the time when comparator 63 turns on and outputs a HI signal. However, this is only one half of the prediction control circuit. Because the output of comparator 63 is input to an AND gate 59, simply the turning on of comparator 63 will not cause the output of a driving wheel slip control signal to reduce torque to the driving wheel.

Therefore, the second part of the prediction control circuit must also be turned on in order to provide a driving wheel slip control signal. In considering the second graph of FIG. 6A which shows the differential slip rate $\lambda \cdot$ with respect to time, it should be noted that predetermined differential slip rate values $\lambda \cdot_1$ and $\lambda \cdot_2$ are indicated on the vertical axis. Solid arrows 84, 86, and 88 represent the points where the value of the differential slip rate $\lambda \cdot$ is greater than the predetermined differential slip rate value $\lambda \cdot_1$. In other words, arrows 84, 86, and 88 represent the points where comparator 58 turns on because the value of the differential slip rate is greater than the predetermined differential slip rate value $\lambda \cdot_1$. As with the other half of the prediction control circuit (comparator 63) discussed above, simply the turning on of comparator 58 will not cause the output of a driving wheel slip control signal to reduce the torque to the driving wheels. Therefore, because comparator 58 is input to AND gate 59, both comparators 58 and 63 must be on in order for a prediction control signal to be issued and thus have the driving wheel slip control signal be issued. Solid arrows 90, 92, and 94 represent the time periods in which the turning on of comparators 58 and 63 overlap, thus causing AND gate 59 to turn on and issue a driving wheel slip control signal. Thus both the signals from the driving wheel speed graph and the differential slip rate graph are combined to result in the output of the prediction control circuit.

Arrows 96 and 98 represent the points where the differential slip rate $\lambda \cdot$ is greater than the predetermined differential slip rate value $\lambda \cdot_2$. It is at the points of arrows 96 and 98 where the comparator 55 of the excessive $\lambda \cdot$ circuit turns on because the differential value of the slip rate from differentiating circuit 54 is greater than the predetermined differential slip rate value $\lambda \cdot_2$ from setting circuit 60. At this point, comparator 55 outputs a high level which causes the output of a driving wheel slip control signal. Thus, arrows 96 and 98 illustrate the operate of the excessive $\lambda \cdot$ control circuit.

The fuel cut signal is shown below the upper two graphs and represents the time when a fuel cut signal is turned on and off. In other words, when the fuel cut signal is on, the ECU inhibits the opening of fuel injector valve 36. When the fuel cut signal is off, the ECU is allowed to transmit the injection time signals to open and close the fuel injector 36 in accordance with usual engine operation. Specifically, at reference numeral 100 the fuel cut signal is turned on by comparator 55 which is represented by arrow 96 on the differential slip rate graph. The fuel cut signal is maintained in the on state by prediction control circuit AND gate 59 which is represented by arrow 90 which indicates the on state of AND gate 59. Further, the excess $\lambda$ circuit, or comparator 64, maintains the fuel cut signal in the on state as illustrated by arrow 72. When the comparator 64 turns off (at the end of arrow 72) the fuel cut signal is turned off at reference numeral 102. The fuel cut signal remains off until reference numeral 104 indicates that it is turned on by the excessive $\lambda \cdot$ circuit represented by arrow 98. This, of course, corresponds to the turning on of comparator 55. As with the previous fuel cut signal in the on state, the operation of prediction control circuit (AND gate 59) is indicated by arrow 92 and the operation of the excess $\lambda$ circuit (comparator 64) is indicated by arrow 74. The fuel cut signal is then turned off when the comparator 64 of the excess $\lambda$ circuit is turned off as illustrated at the end of arrow 74. Once again, the fuel cut signal is turned on at reference 108. However, in this case, the prediction control circuit (AND gate 59) turns on as indicated by arrow 94. The excess $\lambda$ circuit (comparator 64) turns on as represented by arrow 76 and maintains the fuel cut signal in the on state. The graph does not show when the fuel cut signal is turned off.

Figure 6B:
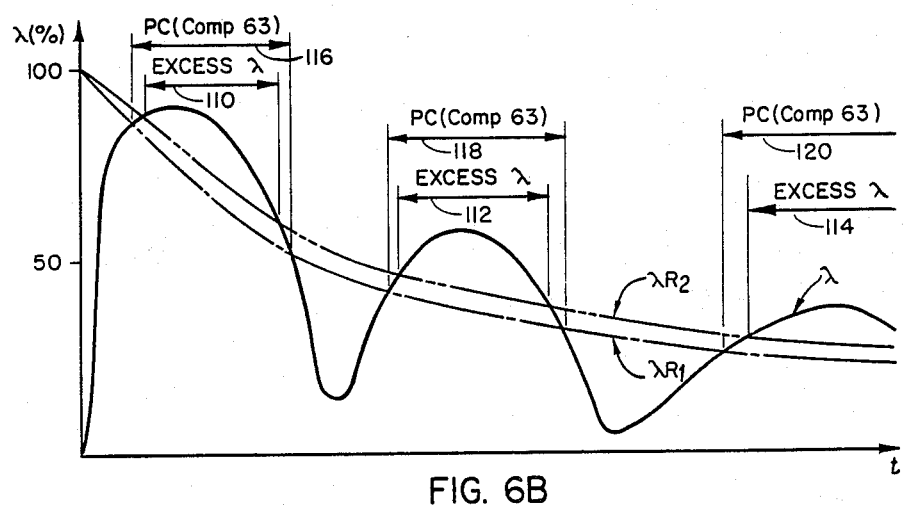
FIG. 6B is a graph of the slip rate $\lambda$ as a function of time as used in an alternate embodiment of the instant invention.

FIG. 6B is directed to an alternate embodiment of the invention, which is described below. Therefore, FIG. 6B will be described in detail below.

Furthermore, since the average value of the speed of the trailing wheels 13 and 14 is considered to be vehicular speed V in the above method, and right and left internal wheel speed differences generally cancel out one another when the vehicle turns, i.e. less error is produced in detecting the vehicular speed V regardless of whether the vehicle is making a right turn or a left turn. Thus, the slip rate control may be performed with a high degree of accuracy. In addition, since a HI-select system has been adopted (see selection circuit 51, above) in which the larger value between the speed of right and left driving wheels 11 and 12 is selected for the driving wheel speed Vw, the driving force is controlled by the wheel with the smaller slip rate, i.e. the friction coefficient between the road surface and the wheel. In this case, since a differential gear apparatus interposed between right and left driving wheels 11 and 12 in ordinary systems, neither driving wheel 11 or 12 is controlled beyond the friction force of the driving wheel for which the driving force has been selected in all the cases of straight running or turning. As a result, the driving wheels on both sides will not slip at the same time, compared with a LOW-Select system in which the smaller value is selected between the speed of right and left driving wheels, thus making it possible to perform sufficient slip rate control. Further, the lowering of the lateral force which can be generated by the wheel adoption of a HI-Select system may be made small for both driving wheels.

Additionally, in the above embodiment, a fuel supply control unit is used as the driving wheel torque control unit and the driving torque of the driving wheels 11 and 12 is reduced by cutting the supply of fuel at a predetermined time by said fuel supply control unit. However, other methods may be employed so that the torque of the driving wheels 11 and 12 may be reduced by having the ignition delayed by an ignition timing unit. Also, as stated above, the torque to the driving wheels, may be reduced by applying brakes to one or both of the driving wheels.

Therefore, as described above, a slip rate control device according to the instant invention, has a driving wheel speed sensor detecting the speed of a driving wheel or wheels, a trailing wheel speed sensor detecting the speed of a trailing wheel or wheels, a slip rate calculating means for calculating the slip rate of the driving wheel based on said detected driving wheel speed and trailing wheel speed. Further the control device has a driving wheel torque control unit for controlling the torque of the driving wheel based on said computed slip rate. A predetermined value setting circuit means is provided for generating a reference value of said slip rate in accordance with a gear ratio of a transmission of the vehicle, wherein said driving wheel torque control unit reduces the torque of said driving wheel when said computed slip rate exceeds the above slip rate reference value. Also, a differential slip rate computing means (or differentiating circuit) is provided for computing the differential (or rate) of the slip rate of the above driving wheel, and a differential slip rate reference value setting means provides a reference value of the differential of said slip rate in accordance with the gear ration of the transmission of the vehicle, wherein the driving torque control unit reduces the torque of said driving wheel when the computed differential of the slip rate exceeds the differential rate reference value.

Thus, control of high precision may be achieved even if the variation width and the variation rate of the slip rate of the driving wheel produced at the time of starting or acceleration in a large horse power vehicle or at the time of starting or acceleration in a vehicle on a slippery road surface may change due to the change of the gear ratio of the transmission, thus resulting in maintenance of maximum friction force between the road surface and wheel. Accordingly, the driving efficiency of the vehicle may be improved and the decrease in lateral force produced by a wheel may be minimized (in other words, the lateral traction of the wheel will be enhanced).

Figure 7:
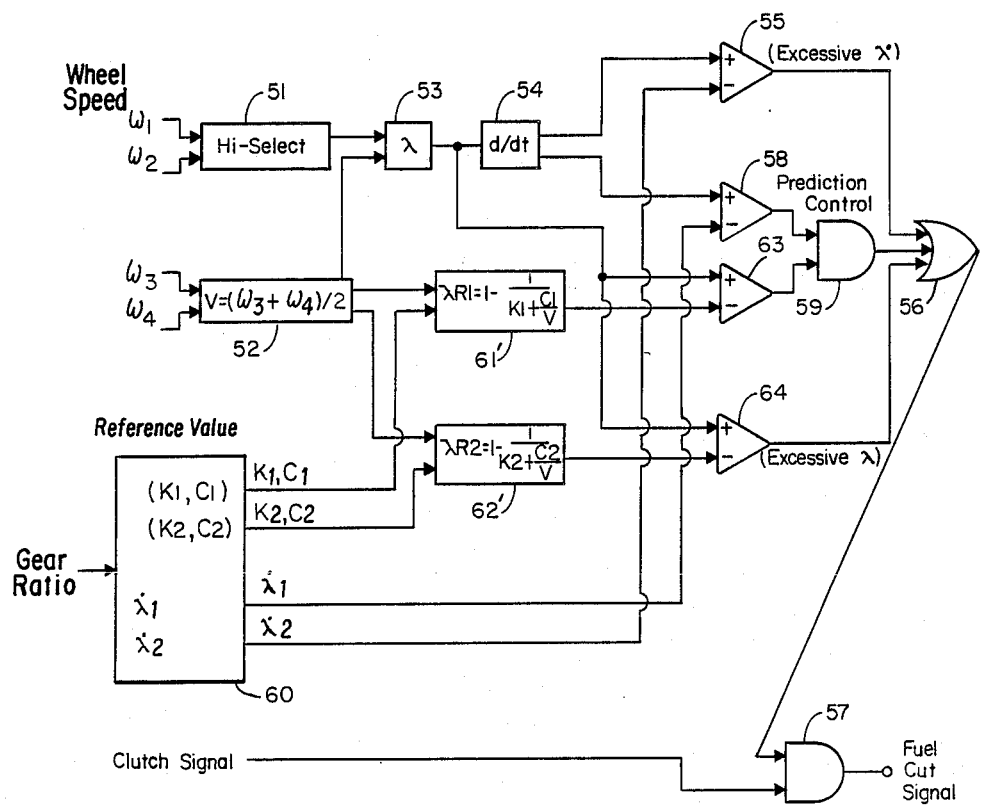
FIG. 7 is a schematic diagram of the above alternate embodiment of the ECU of FIG. 2 and as illustrated in FIG. 6.

FIG. 7 illustrates an alternate embodiment of the circuit of CPU 35b shown in FIG. 2. Specifically, in the alternate embodiment of FIG. 7, the prediction control portion and the excessive λ portion of the circuit compare the slip rate λ (calculated in the slip rate calculating circuit 53) with calculated, reference values, rather than comparing the driving wheel speed with calculated reference values as in FIG. 3.

With regard to the prediction control portion of the circuit, the inputs to the first prediction control decision circuit (or second comparison circuit) 58 are the same as in FIG. 3. However, the inputs to the second prediction control decision circuit (or third comparison circuit) 63 have been altered. More specifically, the positive input to comparator 63 receives the slip rate λ from slip rate calculating circuit 53 rather than a driving wheel speed signal from selection circuit 51.

The negative input of comparator 63 continues to receive the output from first generating circuit 61'. However, the reference value generated by circuit 61' is different than in the embodiment of FIG. 3. Specifically, first generating circuit 61' continues to receive the outputs of setting circuit 60, which include values $K_1$ and $C_1$. The reference value $\lambda_{R1}$ generated by circuit 61' is determined in accordance with the following equation:

$$\lambda_{R1} = 1 - \frac{1}{K_1 + \frac{C_1}{V}} \quad \text{(X)}$$

where V is the vehicular speed determined by arithmetic circuit 52. Equation X above is derived from the basic equation for λ:

$$\lambda = \frac{\omega_D - \omega_T}{\omega_D} \quad \text{(XI)}$$

Then, assuming that $\omega_D$, the actual detected driving wheel speed, is equal to $V_{R1}$, the reference speed value, then equation IV can be written as follows:

$$\omega_D = K_1 V + C_1 \quad \text{(XII)}$$

Thus substituting equation XII for $\omega_D$ and vehicular speed V for $\omega_T$, equation XI may be written as follows:

$$\lambda_{R1} = 1 - \frac{V}{K_1 V + C_1} \quad \text{(XIII)}$$

which results in equation X:

$$\lambda_{R1} = 1 - \frac{1}{K_1 + \frac{C_1}{V}} \quad \text{(X)}$$

Figure 8:
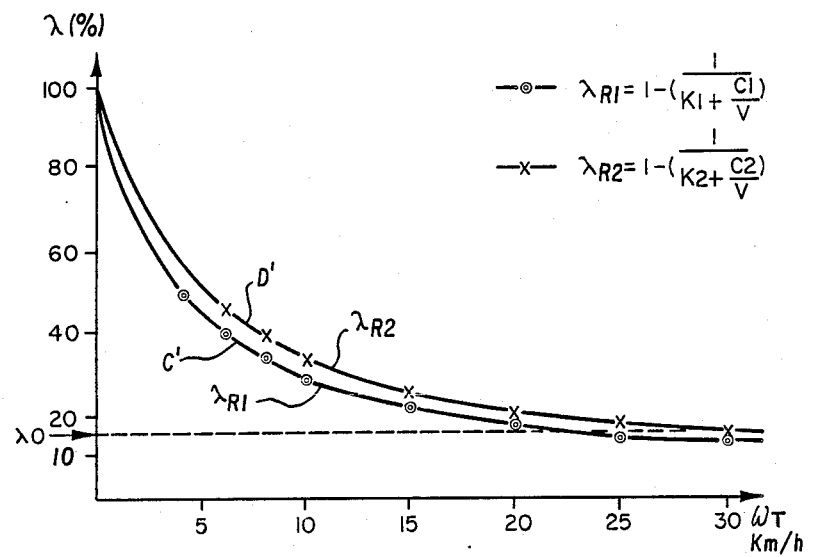
FIG. 8 is a graph showing the trailing wheel speed versus the slip rate for the alternate embodiment of FIG. 7.

Therefore, the output of circuit 61', determined as set forth above, is used as a reference value for the negative input of comparator 63. FIG. 8 (described below) represents the value of $\omega_{R1}$ in a graph.

With regard to the excessive λ portion of the circuit, the positive input to the excessive λ decision circuit (or fourth comparison circuit) 64 is received from slip rate calculating circuit 53, rather than from selection circuit 51. In other words, the slip rate λ is provided to the positive input of comparator 64 rather than the driving wheel speed being provided to comparator 64.

The negative input of comparator 64 is still received from second generating circuit 62'. However, as with first generating circuit 61' (described below); in this alternate embodiment, the reference value generated by circuit 62' is different from that of the circuit of FIG. 3. Specifically, circuit 62' generates a reference value $\lambda_{R2}$ which is applied to the negative input of comparator 64. Reference value $\lambda_{R2}$ is determined according to the following equation:

$$\lambda_{R2} = 1 - \cfrac{1}{K_2 + \cfrac{C_2}{V}} \qquad \text{(XIV)}$$

where $K_2$ and $C_2$ are values supplied for setting circuit 60, and V is the vehicular speed. The value for $\lambda_{R2}$ is derived in the same manner as the value for $\lambda_{R1}$ explained above.

FIG. 8 is a graph illustrating the trailing wheel speed $\omega_T$ versus the slip rate $\lambda$. The trailing wheel speed $\omega_T$ is represented on the horizontal axis and the slip rate $\lambda$ is represented on the vertical axis. The first reference value $\lambda_{R1}$ from the first generating circuit 61' is determined according to equation X and is illustrated by curve C' in FIG. 8. Accordingly, the second reference value $\lambda_{R2}$ from second generating circuit 62' is determined according to equation XIV and is illustrated by curve D' in FIG. 8.

FIG. 6B shows the alternate embodiment (as illustrated in FIG. 7) wherein the slip rate $\lambda$ is shown as a function of time t. The reference values $\lambda_{R1}$ and $\lambda_{R2}$ are similarly illustrated as in FIG. 8. FIG. 6B may be compared with the differential slip rate graph of FIG. 6A above since FIGS. 6A and 6B are aligned with one another. When, in FIG. 6B, $\lambda$ is greater than $\lambda_{R2}$ as shown at reference numerals 110, 112 and 114, then comparator 64 of FIG. 7 is turned on to activate the excessive $\lambda$ circuit and a driving wheel slip control signal is issued. When $\lambda$ is greater than $\lambda_{R1}$ as shown at reference numerals 116, 118 and 120 and labeled as PC (comp 63), then comparator 63 of FIG. 7 is turned on to activate one-half of the prediction control circuit. Arrows 116, 118 and 120 of FIG. 6B may be compared with arrows 84, 86 and 88 of FIG. 6A to determined whether or not the prediction control circuit will be activated.

Figure 9:
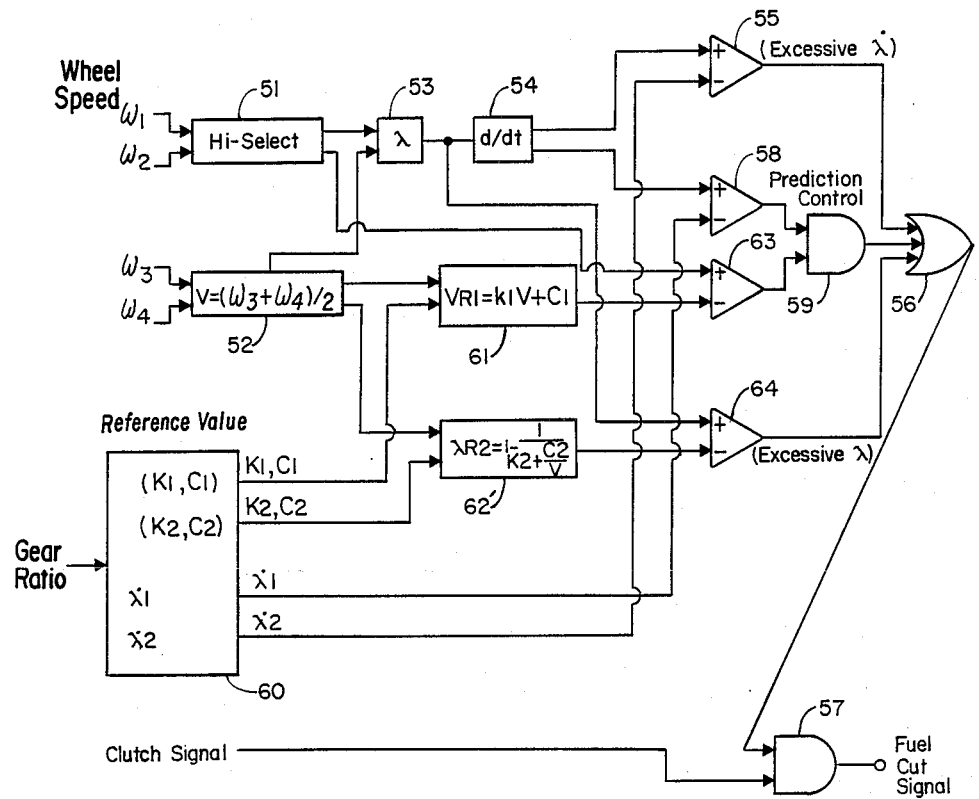
FIG. 9 is a schematic diagram illustrating a third embodiment of the ECU of FIG. 2.
Figure 10:
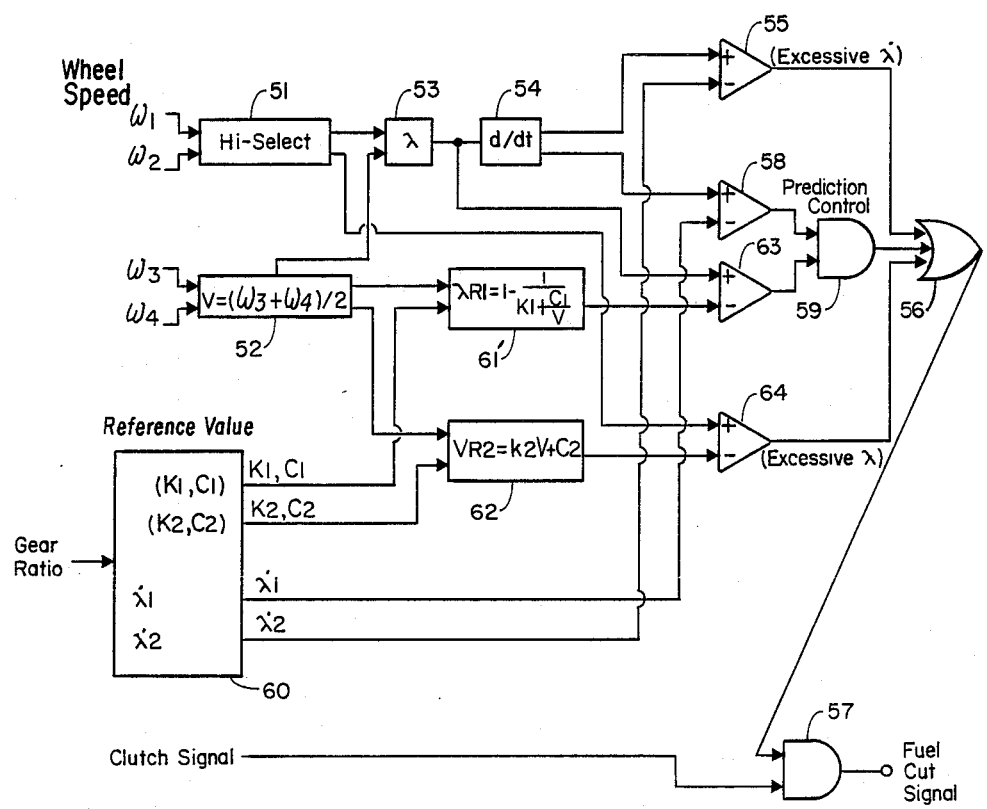
FIG. 10 is a schematic diagram illustrating a fourth embodiment of the ECU of FIG. 2.

FIGS. 9 and 10 are third and fourth embodiments of the circuit of CPU 35b. Basically, FIG. 3 represents the first embodiment, and FIG. 7 represents the second embodiment of the invention. In FIG. 7, the prediction control circuit (comparator 63) and excessive $\lambda$ circuit (comparator 64) use the slip rate to compare with reference values rather than comparing the driving wheel speed signal with reference values. FIGS. 9 and 10 are embodiments which are found somewhere in between FIGS. 3 and 7.

For example, in FIG. 9, comparator 63 of the prediction control circuit receives its positive input from selection circuit 51, as in FIG. 3. The minus input of comparator 63 receives the reference value $V_{R1}$ from first generating circuit 61, also as in FIG. 3. However, comparator 64 of the excessive $\lambda$ circuit receives its positive input from the slip rate calculating circuit 53, and its negative input from second generating circuit 62'. Further, circuit 62 provides the reference value $\lambda_{R2}$ to comparator 64 as in the embodiment of FIG. 7.

With regard to FIG. 10, comparator 63 of the prediction control circuit receives its positive input from slip rate calculating circuit 53, as in FIG. 7. The minus input of comparator 63 receives a reference value $\lambda_{R1}$ from first generating circuit 61', also as in FIG. 7. However, comparator 64 of the excessive $\lambda$ circuit receives its positive input from selection circuit 51, and its negative input from second generating circuit 62. The reference value provided from circuit 62 to comparator 64 is $V_{R2}$, as in the embodiment of FIG. 3. Otherwise, FIGS. 9 and 10 are similar to FIGS. 3 and 7.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A control system for controlling the slip of a driving wheel of a vehicle, said system comprising:
   driving wheel speed sensor means for sensing the speed of a driving wheel and for generating a driving wheel speed signal as a function thereof;
   vehicle speed sensor means for sensing the speed of the vehicle and for generating a vehicle speed signal as a function thereof;
   slip rate calculating means, operatively coupled to said driving wheel speed sensor means and said vehicle speed sensor means, for calculating a slip rate ($\lambda$) of said driving wheel with respect to the movement of said vehicle;
   differentiating means, coupled to said slip rate calculating means, for calculating the differential value ($\dot{\lambda}$) of said slip rate;
   means for generating a gear ratio signal;
   output means, coupled to said differentiating means and said gear ratio signal generating means, for providing a driving wheel slip control signal in response to said differential value ($\dot{\lambda}$) of said slip rate and said gear ratio signal.

2. A control system for controlling the slip of a driving wheel of a vehicle, said system comprising:
   driving wheel speed sensor means for sensing the speed of a driving wheel and for generating a driving wheel speed signal as a function thereof;
   vehicle speed sensor means for sensing the speed of said vehicle and for generating a vehicle speed signal as a function thereof;
   slip rate calculating means, coupled to said driving wheel sensor means and said vehicle speed sensor means, for calculating a slip rate ($\lambda$) of said driving wheel with respect to the movement of said vehicle;
   differentiating means, coupled to said slip rate calculating means, for calculating the differential value ($\dot{\lambda}$) of said slip rate;
   first generating means, operatively coupled to said vehicle speed sensor means, for generating a first reference value as a function of said vehicle speed;
   second detecting means, coupled to said first generating means and said driving wheel speed sensor means, for detecting a second slip condition from said first reference value and said driving wheel speed signal and outputting a second slip signal when said second slip condition is detected; and
   output means, coupled to said differentiating means and said second detecting means, for providing a driving wheel slip control signal in response to said second slip signal from said second detecting means and said differential value of said slip rate.

3. A control system for controlling the slip of a driving wheel of a vehicle, said system comprising:
   driving wheel speed sensor means for sensing the speed of a driving wheel and for generating a driving wheel speed signal as a function thereof;

vehicle speed sensor means for sensing the speed of said vehicle and for generating a vehicle speed signal as a function thereof;

slip rate calculating means, coupled to said driving wheel sensor means and said vehicle speed sensor means, for calculating a slip rate (λ) of said driving wheel with respect to the movement of said vehicle;

differentiating means, coupled to said slip rate calculating means, for calculating the differential value (λ·) of said slip rate;

first generating means for generating a first reference value;

second detecting means, coupled to said first generating means and said slip rate calculating means, for detecting a second slip condition from said first reference value and said slip rate and outputting a second slip signal when said second slip condition is detected; and output means coupled to said differentiating means and said second detecting means for providing a driving wheel slip control signal in response to said second slip signal from said second detecting means and said differential value of said slip rate.

4. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of said vehicle and for generating a vehicle speed signal as a function thereof;

setting circuit means for generating a second predetermined constant value signal;

means for generating a gear ratio signal, coupled to said setting circuit means, for controlling the output thereof as a function of the gear ratio of the vehicle;

second generating means, operatively connected to said vehicle speed sensor means and said setting circuit means, for generating a second reference value as a function of the sum of said vehicle speed signal and said second predetermined constant value signal;

detecting means, operatively connected to said driving wheel speed sensor means and said second generating means, for detecting an excess slip condition from said driving wheel speed signal and said second reference value and outputting a slip signal when said driving wheel speed signal is greater than said reference value; and output means coupled to said detecting means, for providing a driving wheel slip control signal in response to the output of said detecting means.

5. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of said vehicle and for generating a vehicle speed signal as a function thereof;

slip rate calculating means, coupled to said driving wheel speed sensor means and said vehicle speed sensor means for calculating the slip rate of the driving wheel with respect to the movement of said vehicle as a function of said driving wheel speed signal and said vehicle speed signal and for generating a slip rate signal in accordance therewith;

setting circuit means for generating a predetermined constant value signal;

means for generating a gear ratio signal, coupled to said setting circuit means, for controlling the output thereof as a function of the gear ratio of the vehicle;

a second generating means, operatively connected to said vehicle speed sensor means and said setting circuit means, for generating a second reference value as a function of said vehicle speed signal and said predetermined constant value;

a detecting means, operatively connected to said slip rate calculating means and said second generating means, for detecting an excess slip condition for said slip rate signal and said second reference value and outputting a slip signal when said slip rate signal is greater than said second reference value; and output means coupled to said detecting means, for providing a driving wheel slip control signal in response to the output of said detecting means.

6. A control system for controlling the slip of a driving wheel of a vehicle, said system comprising:

driving wheel speed sensor means for sensing the speed of a driving wheel and for generating a driving wheel speed signal as a function thereof;

vehicle speed sensor means for sensing the speed of said vehicle and for generating a vehicle speed signal as a function thereof;

slip rate calculating means, coupled to said driving wheel speed sensor means and said vehicle speed sensor means, for calculating a slip rate of said driving wheel with respect to the movement of said vehicle;

differentiating means, coupled to said slip rate calculating means, for calculating the differential value of said slip rate;

first generating means, operatively coupled to said vehicle speed sensor means for generating a first reference value as a function of vehicle speed;

third detecting means, coupled to said first generating means and said driving wheel speed sensor means, for detecting a second slip condition from said first reference value and said driving wheel speed signal and outputting a second slip signal when said second slip condition is detected;

second generating means, operatively coupled to said vehicle speed sensor means for generating a second reference value as a function of vehicle speed;

fourth detecting means, operatively coupled to said driving wheel speed sensor means and said second generating means for detecting an excess slip condition from said driving wheel speed signal and said second reference value and outputting a third slip signal when said driving wheel speed signal is greater than said second reference value;

output means, coupled to said differentiating means and said third and fourth detecting means, for providing a driving wheel slip control signal in response to at least one of (i) said differential value of said slip rate;

(ii) said differential value of said slip rate and said second slip signal from said third detecting means;

(iii) said third slip signal from said fourth detecting means.

7. A control system for controlling the slip of a driving wheel of a vehicle, said system comprising:
  driving wheel speed sensor means for sensing the speed of a driving wheel and for generating a driving wheel speed signal as a function thereof;
  vehicle speed sensor means for sensing the speed of said vehicle and for generating a vehicle speed signal as a function thereof;
  slip rate calculating means, coupled to said driving wheel speed sensor means and said vehicle speed sensor means, for calculating a slip rate of said driving wheel with respect to the movement of said vehicle;
  differentiating means, coupled to said slip rate calculating means, for calculating the differential value of said slip rate;
  first generating means for generating a first reference value;
  third detecting means, coupled to said first generating means and said slip rate calculating means, for detecting a second slip condition from said first reference value and said slip rate and outputting a second slip signal when said second slip condition is detected;
  second generating means, operatively coupled to said vehicle speed sensor means for generating a second reference value as a function of vehicle speed;
  fourth detecting means, operatively coupled to said driving wheel speed sensor means and said second generating means for detecting an excess slip condition from said driving wheel speed signal and said second reference value and outputting a third slip signal when said driving wheel speed signal is greater than said second reference value;
  output means, coupled to said differentiating means and said third and fourth detecting means, for providing a driving wheel slip control signal in response to at least one of
    (i) said differential value of said slip rate;
    (ii) said differential value of said slip rate and said second slip signal from said third detecting means;
    (iii) said third slip signal from said fourth detecting means.

8. A control system for controlling the slip of a driving wheel of a vehicle, said system comprising:
  driving wheel speed sensor means for sensing the speed of a driving wheel and for generating a driving wheel speed signal as a function thereof;
  vehicle speed sensor means for sensing the speed of said vehicle and for generating a vehicle speed signal as a function thereof;
  slip rate calculating means, coupled to said driving wheel speed sensor means and said vehicle speed sensor means, for calculating a slip rate of said driving wheel with respect to said vehicle movement;
  differentiating means, coupled to said slip rate calculating means, for calculating the differential value of said slip rate;
  first generating means, operatively coupled to said vehicle speed sensor means for generating a first reference value as a function of vehicle speed;
  third detecting means, coupled to said first generating means and said driving wheel speed sensor means, for detecting a second slip condition from said first reference value and said driving wheel speed signal and outputting a second slip signal when said second slip condition is detected;
  second generating means for generating a second reference value;
  fourth detecting means, operatively coupled to said slip rate calculating means and said second generating means for detecting an excess slip condition from said slip rate and said second reference value and outputting a third slip signal when said slip rate is greater than said second reference value;
  output means, coupled to said differentiating means and said third and fourth detecting means, for providing a driving wheel slip control signal in response to at least one of
    (i) said differential value of said slip rate;
    (ii) said differential value of said slip rate and said second slip signal from said third detecting means;
    (iii) said third slip signal from said fourth detecting means.

9. A control system for controlling the slip of a driving wheel of a vehicle, said system comprising:
  driving wheel speed sensor means for sensing the speed of a driving wheel and for generating a driving wheel speed signal as a function thereof;
  vehicle speed sensor means for sensing the speed of said vehicle and for generating a vehicle speed signal as a function thereof;
  slip rate calculating means, coupled to said driving wheel speed sensor means and said vehicle speed sensor means, for calculating a slip rate of said driving wheel with respect to the movement of said vehicle;
  differentiating means, coupled to said slip rate calculating means, for calculating the differential value of said slip rate;
  first generating means for generating a first reference value;
  third detecting means, coupled to said first generating means and said slip rate calculating means, for detecting a second slip condition from said first reference value and said slip rate and outputting a second slip signal when said second slip condition is detected;
  second generating means for generating a second reference value;
  fourth detecting means, operatively coupled to said slip rate calculating means and said second generating means for detecting an excess slip condition from said slip rate signal and said second reference value and outputting a third slip signal when said slip rate signal is greater than said second reference value;
  output means, coupled to said differentiating means and said third and fourth detecting means, for providing a driving wheel slip control signal in response to at least one
    (i) said differential value of said slip rate;
    (ii) said differential value of said slip rate and said second slip signal from said third detecting means;
    (iii) said third slip signal from said fourth detecting means.

10. The control system of claim 1, including
  a setting circuit means receiving said gear ratio signal from said gear ratio signal generating means for generating a predetermined differential slip rate value as a function of said gear ratio signal, and wherein said output means includes a comparison means operatively coupled to said differentiating means and said setting circuit means, for comparing said differential value of said slip rate with said predetermined differential slip rate value and outputting an excess slip signal when said differential value of said slip rate is greater than said predetermined differential slip rate value, and wherein said output means provides said driving wheel slip control signal in response to said excess slip signal output from said comparison means.

11. The control system of claim 2, including a setting circuit means for generating a predetermined differential slip rate value, and wherein said output means includes a first comparison means operatively coupled to said differentiating means and said setting circuit means, for comparing said differential value of said slip rate with said predetermined differential slip rate value and outputting a first slip signal when said differential value of said slip rate is greater than said predetermined differential slip rate value, and wherein said second detecting means includes a second comparison means for comparing the output of said first generating means and said driving wheel speed sensor and for outputting said second slip signal when said driving wheel speed signal is greater than said first reference value, and wherein said output means provides said driving wheel slip control signal in response to said first and second slip signals from said first and second comparison means.

12. The control system of claim 3, including a setting circuit means for generating a predetermined differential slip rate value, and wherein said output means includes a first comparison means operatively coupled to said differentiating means and said setting circuit means, for comparing said differential value of said slip rate with said predetermined differential slip rate value and outputting a first slip signal when said differential value of said slip rate is greater than said predetermined differential slip rate value, and wherein said second detecting means includes a second comparison means for comparing the output of said first generating means and said slip rate calculating means and for outputting said second slip signal when said slip rate is greater than said first reference value, and wherein said output means provides said driving wheel slip control signal in response to said first and second slip signals from said first and second comparison means.

13. The control system of claim 4, wherein said detecting means comprises a comparison means for comparing said driving wheel speed signal and said second reference value and for outputting said slip signal when said driving wheel speed signal is greater than said second reference value.

14. The control system of claim 5, wherein said detecting means comprises a comparison means for comparing said slip rate and said second reference value and for outputting said slip signal when said slip rate is greater than said second reference value.

15. The control system of claim 6, including setting circuit means for generating a first predetermined differential slip rate value, and a second predetermined differential slip rate value wherein said second predetermined differential slip rate value is greater than said first predetermined differential slip rate value, and wherein said output means includes first comparison means, operatively coupled to said differentiating means and said setting circuit means, for comparing said differential value of said slip rate with said second predetermined differential slip rate value and outputting a first excess slip signal when said differential value of said slip rate is greater than said second predetermined differential slip rate value; and wherein said output means includes second comparison means, operatively coupled to said differentiating means and said setting circuit means, for comparing said differential value of said slip rate with said first predetermined differential slip rate value and outputting a first slip signal when said differential value of said slip rate is greater than said first predetermined differential slip rate value; and wherein said third detecting means includes a third comparison means for comparing said first reference value with said driving wheel speed signal and outputting said second slip signal when said driving wheel speed signal is greater than said first reference value, and wherein said fourth detecting means includes a fourth comparison means for comparing said driving wheel speed signal with said second reference value and outputting said third slip signal when said driving wheel speed signal is greater than said second reference value, and wherein said output means provides said driving wheel slip control signal when at least one of:
 (i) said first comparison means outputs said first excess slip signal;
 (ii) both said second and third comparison means output said first and second slip signals;
 (iii) said fourth comparison means outputs said third slip signal.

16. The control system of claim 7, including setting circuit means for generating a first predetermined differential slip rate value, and a second predetermined differential slip rate value wherein said second predetermined differential slip rate value is greater than said first predetermined differential slip rate value, and wherein said output means includes first comparison means, operatively coupled to said differentiating means and said setting circuit means, for comparing said differential value of said slip rate with said second predetermined differential slip rate value and outputting a first excess slip signal when said differential value of said slip rate is greater than said second predetermined differential slip rate value; and wherein said output means includes second comparison means, operatively coupled to said differentiating means and said setting circuit means, for comparing said differential value of said slip rate with said first predetermined differential slip rate value and outputting a first slip signal when said differential value of said slip rate is greater than said first predetermined differential slip rate value; and wherein said third detecting means includes a third comparison means for comparing said first reference value with said slip rate and outputting said second slip signal when said slip rate is greater than said first reference value, and wherein said fourth detecting means includes a fourth comparison means for comparing said driving wheel speed signal with said second reference value and outputting said third slip signal when said driving wheel speed signal is greater than said second reference value, and wherein said output means provides said driving wheel slip control signal when at least one of:
(i) said first comparison means outputs said first excess slip signal;
(ii) both said second and third comparison means output said first and second slip signals;
(iii) said fourth comparison means outputs said third slip signal.

17. The control system of claim 8, including setting circuit means for generating a first predetermined differential slip rate value, and a second predetermined differential slip rate value wherein said second predetermined differential slip rate value is greater than said first predetermined differential slip rate value, and wherein said output means includes first comparison means, operatively coupled to said differentiating means and said setting circuit means, for comparing said differential value of said slip rate with said second predetermined differential slip rate value and outputting a first excess slip signal when said differential value of said slip rate is greater than said second predetermined differential slip rate value; and wherein said output means includes second comparison means, operatively coupled to said differentiating means and said setting circuit means, for comparing said differential value of said slip rate with said first predetermined differential slip rate value and outputting a first slip signal when said differential value of said slip rate is greater than said first predetermined differential slip rate value; and wherein said third detecting means includes a third comparison means for comparing said first reference value with said driving wheel speed signal and outputting said second slip signal when said driving wheel speed signal is greater than said first reference value, and wherein said fourth detecting means includes a fourth comparison means for comparing said slip rate with said second reference value and outputting said third slip signal when said slip rate is greater than said second reference value, and wherein said output means provides said driving wheel slip control signal when at least one of:
(i) said first comparison means outputs said first excess slip signal;
(ii) both said second and third comparison means output said first and second slip signals;
(iii) said fourth comparison means outputs said third slip signal.

18. The control system of claim 9, including setting circuit means for generating a first predetermined differential slip rate value, and a second predetermined differential slip rate value wherein said second predetermined differential slip rate value is greater than said first predetermined differential slip rate value, and wherein said output means includes first comparison means, operatively coupled to said differentiating means and said setting circuit means, for comparing said differential value of said slip rate with said second predetermined differential slip rate value and outputting a first excess slip signal when said differential value of said slip rate is greater than said second predetermined differential slip rate value; and wherein said output means includes second comparison means, operatively coupled to said differentiating means and said setting circuit means, for comparing said differential value of said slip rate with said first predetermined differential slip rate value and outputting a first slip signal when said differential value of said slip rate is greater than said first predetermined differential slip rate value; and wherein said third detecting means includes a third comparison means for comparing said first reference value with said slip rate and outputting said second slip signal when said slip rate is greater than said first reference value, and wherein said fourth detecting means includes a fourth comparison means for comparing said slip rate with said second reference value and outputting said third slip signal when said slip rate is greater than said second reference value, and wherein said output means provides said driving wheel slip control signal when at least one of:
(i) said first comparison means outputs said first excess slip signal;
(ii) both said second and third comparison means output said first and second slip signals;
(iii) said fourth comparison means outputs said third slip signal.

19. The control system of any one of claims 11, 15 and 17 wherein said setting circuit means further generates a first predetermined coefficient and wherein said function of vehicle speed is the product of said vehicle speed and said first predetermined coefficient.

20. The control system of any one of claims 11, 15 and 17 wherein said setting circuit means generates a first predetermined constant value; and said first generating means is coupled to said setting circuit means; and said first reference value is the sum of said function of said vehicle speed signal and said first predetermined constant.

21. The control system of claim 19 wherein said setting circuit means generates a first predetermined constant value; and said first generating means is coupled to said setting circuit means; and said first reference value is the sum of said function of said vehicle speed signal and said first predetermined constant.

22. The control system of any one of claims 12, 16 and 18 wherein said setting circuit means further generates first predetermined constants; and said first generating means is coupled to said setting circuit means; and wherein said first reference value is $$\lambda_{R1} = 1 - \frac{1}{K_1 + \frac{C_1}{V}}$$

where $\lambda_{R1}$ is said first reference value, $K_1$ and $C_1$ are said first predetermined constants and V is said vehicle speed signal.

23. The control system of any one of claims 13, 15 and 16 wherein said setting circuit means further generates a second predetermined coefficient and wherein said second reference value is the sum of said second predetermined constant value and the product of said second predetermined coefficient and said vehicle speed signal.

24. The control system of any one of claims 14, 17 and 18 wherein said setting circuit means generates second predetermined constants, and wherein said second reference value is $$\lambda_{R2} = 1 - \frac{1}{K_2 + \frac{C_2}{V}}$$

where $\lambda_{R2}$ is said second reference value, $K_2$ and $C_2$ are said second predetermined constants and V is said vehicle speed signal.

25. The control system of any one of claims 1–18 wherein said vehicle is a four wheel vehicle having two driving wheels, and wherein said driving wheel sensor means generates said driving wheel speed signal as a function of the fastest of said driving wheels.

26. The control system of any one of claims 1–18 wherein said vehicle speed sensor means senses the speed of at least one trailing wheel of said vehicle.

27. The control system of claim 26 wherein said vehicle is a four wheel vehicle having two trailing wheels and wherein said vehicle speed sensor means senses the speed of both trailing wheels and generates a vehicle speed signal which is a function of the average value of said trailing wheel speeds.

28. The control system of any one of claims 1–18 wherein said output means is coupled to means for decreasing engine torque.

29. The control system of any one of claims 1–18 wherein said output means is coupled to means for cutting fuel supply to the engine.

30. The control system of any one of claims 1–18 further comprising clutch signal means for generating a clutch engaged signal when the clutch of said vehicle is engaged and means coupled to said clutch signal means and said output means for providing an output when both said clutch signal and said driving wheel slip control signal are applied thereto.

31. The control system of any one of claims 2, 3, 6–9, 11, 12 and 15–18 including means for generating a gear ratio signal, and wherein said output means is also coupled to said gear ratio signal generating means and provides said driving wheel slip control signal also as a function of said gear ratio signal.

32. A slip control system for controlling excess slip of a driving wheel of a vehicle, said system comprising:
driving wheel speed sensor means for sensing the speed of a driving wheel and for generating a driving wheel speed signal as a function thereof;
vehicle speed sensor means for sensing the speed of said vehicle and for generating a vehicle speed signal as a function thereof;
slip rate calculating means, coupled to said driving wheel sensor means and said vehicle speed sensor means, for calculating a slip rate ($\lambda$) of said driving wheel with respect to the movement of said vehicle;
differentiating means, coupled to said slip rate calculating means, for calculating the differential value ($\lambda\cdot$) of said slip rate;
detecting means, operatively coupled to said differentiating means and said slip rate calculating means, for detecting a plurality of slip conditions from said differential value of said slip rate and from said slip rate;
output means, coupled to said detecting means, for providing a driving wheel slip control signal when one of said plurality of slip conditions is detected.

33. A slip control system for controlling excess slip of a driving wheel of a vehicle, said system comprising:
driving wheel speed sensor means for sensing the speed of a driving wheel and for generating a driving wheel speed signal as a function thereof;
vehicle speed sensor means for sensing the speed of said vehicle and for generating a vehicle speed signal as a function thereof;
slip rate calculating means, coupled to said driving wheel sensor means and said vehicle speed sensor means, for calculating a slip rate ($\lambda$) of said driving wheel with respect to the movement of said vehicle
differentiating means, coupled to said slip rate calculating means, for calculating the differential value ($\lambda\cdot$) of said slip rate;
detecting means, operatively coupled to said differentiating means, driving wheel speed sensor means and said vehicle speed sensor means, for detecting a plurality of slip conditions from said differential value of said slip rate and relationship between driving wheel speed signal and vehicle speed signal
output means, coupled to said detecting means, for providing a driving wheel slip control signal when one of said plurality of slip conditions is detected.

* * * * *